May 23, 1933. J. H. ELLINGHAUSEN 1,910,097
ORCHARD HEATER
Filed March 11, 1932 3 Sheets-Sheet 1
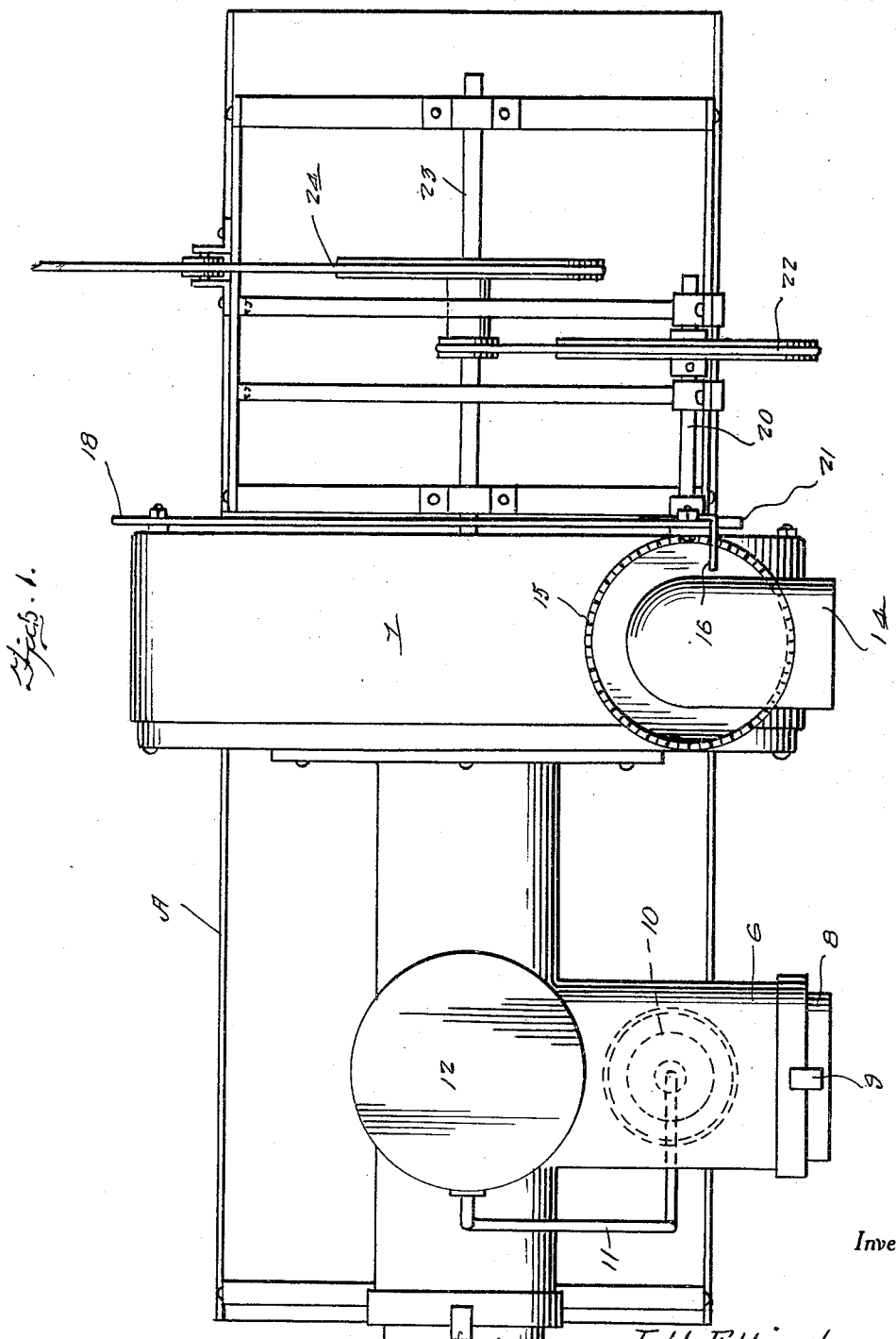
Inventor
J. H. Ellinghausen
By Clarence A. O'Brien
Attorney

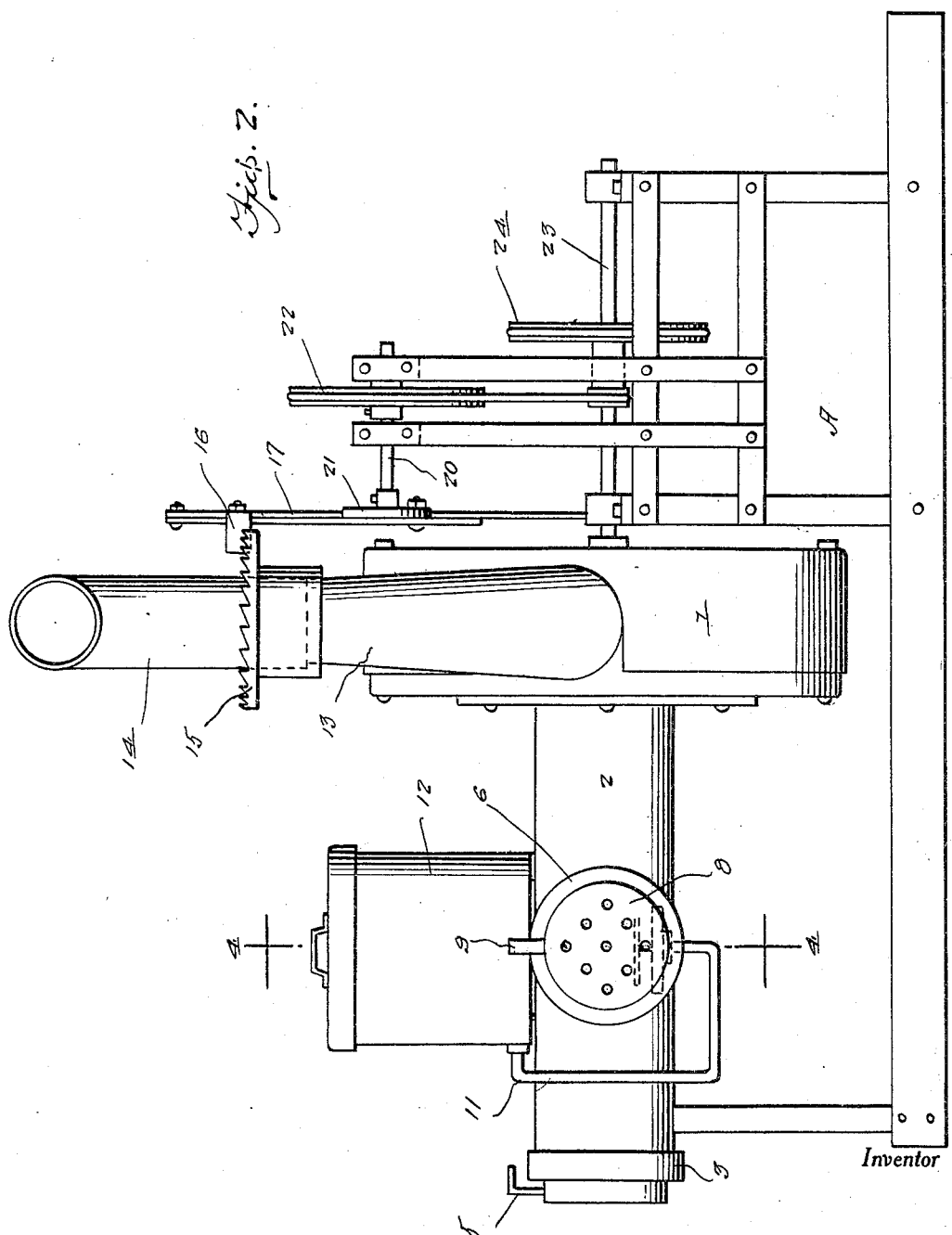

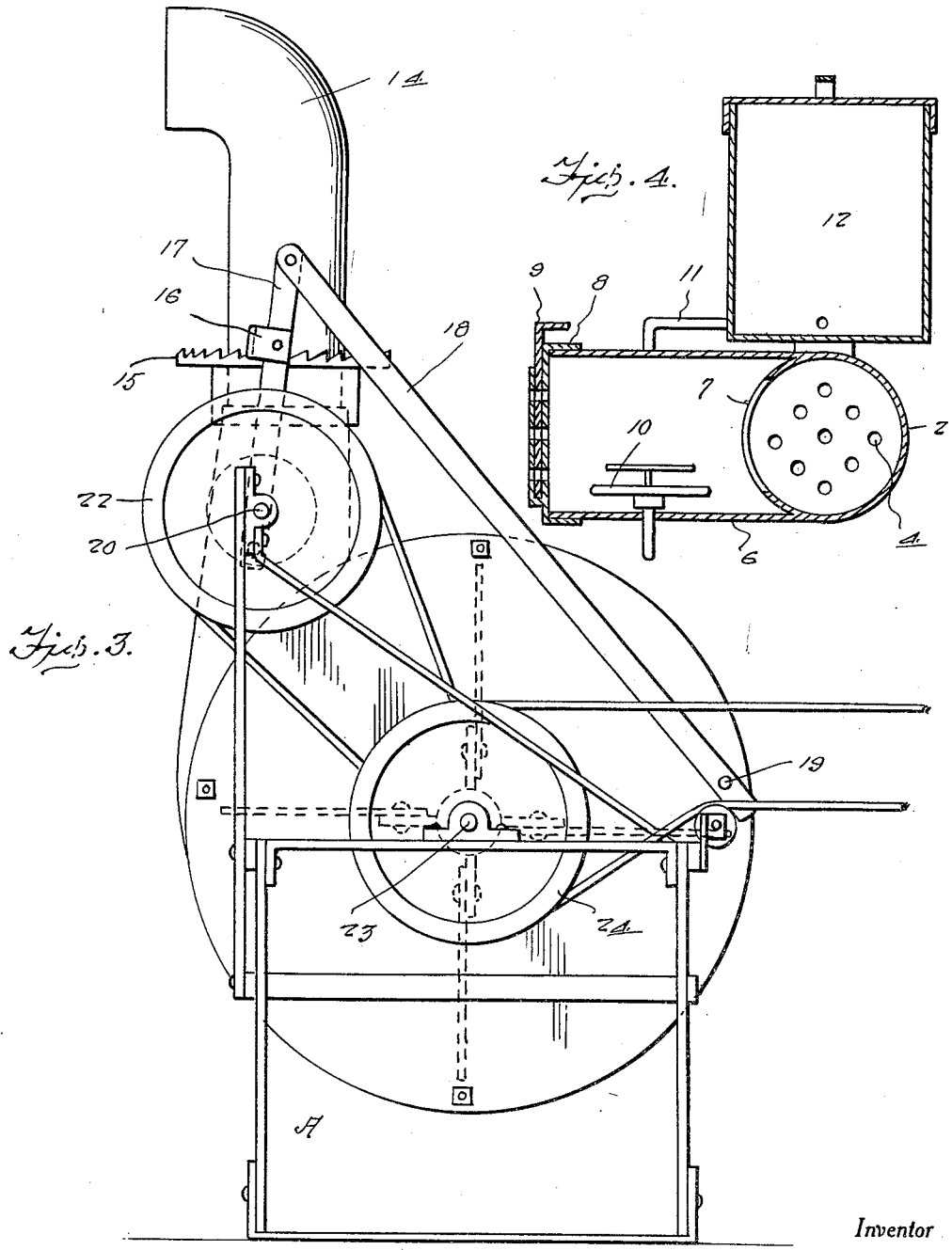

Patented May 23, 1933

1,910,097

UNITED STATES PATENT OFFICE

JOHN H. ELLINGHAUSEN, OF ORANGE, CALIFORNIA

ORCHARD HEATER

Application filed March 11, 1932. Serial No. 598,266.

This invention relates to an orchard heater, the general object of the invention being to provide means for heating large areas and without the use of smoke.

This invention also consists in certain other features of construction and in the combination and arrangement of the several parts to be hereinafter fully described, illustrated in the accompanying drawings and specifically pointed out in the appended claims.

In describing the invention in detail, reference will be had to the accompanying drawings wherein like characters denote like or corresponding parts throughout the several views, and in which:—

Figure 1 is a top plan view of the invention.

Fig. 2 is a side view thereof.

Fig. 3 is an end view.

Fig. 4 is a section on line 4—4 of Fig. 2.

In these views, the letter A indicates a frame for supporting the device and the numeral 1 indicates a vertically arranged blower casing to the inlet of which is connected one end of a horizontal cylinder 2. The outer end of this cylinder carries a cap 3 having perforations 4 therein, and a perforated shutter 5 is associated with the cap for opening and closing the perforations therein.

A tubular member 6 extends at right angles from the cylinder 2 and has one end connected therewith and this part 6 is in communication with the cylinder through the opening 7. The outer end of this part 6 also carries a perforated cap 8, the perforations of which are opened and closed by a perforated shutter 9. A burner 10 is located in the member 6 and is connected by the pipe 11 to a fluid tank 12 suitably supported in the frame. The discharge pipe of the blower is shown at 13 and an extension 14 is rotatably connected with the upper end of the spout and said extension is formed with a curved outlet end as shown in Fig. 3.

A toothed wheel 15 is connected to the base of the extension 14 and the teeth of which are engaged by a dog 16 on an arm 17 which has its upper end pivoted to the upper end of a bar 18, the lower end of which is pivoted to the blower casing as shown at 19, this part extending diagonally upwardly as shown in Fig. 3. A shaft 20 is journalled in the frame and carries a crank disk 21 to the pin of which the lower part of the arm 17 is pivoted. This shaft 20 is driven by pulleys and a belt shown generally at 22 on the shaft 23 which operates the rotor of the blower and which is driven from any suitable source of power through the pulley and belt shown generally at 24.

Thus it will be seen that when the burner is in operation and the blower is in operation, air will be drawn through the perforations in the outer end of the cylinder 2 and the outer end of the member 6 into the blower and the air passes through the member 6 and will be heated before it reaches the cylinder 2.

By regulating the shutters, the air passing into the blower can be heated to the desired extent. The heated air escapes from the blower through the pipe 13 and its extension 14 and as this extension is being rotated by the means before described, the air will be directed in different directions during the rotation of the extension 14, so that the device will heat a considerable area and thus protect the orchard or crop from frost. This device eliminates the objectionable smudge pots, the smoke of which causes a great deal of trouble, and this device is much less expensive to operate than the smudge pots, as the one device will protect a large area from frost.

It is thought from the foregoing description, that the advantages and novel features of the invention will be readily apparent.

It is to be understood that changes may be made in the construction and in the combination and arrangement of the several parts provided that such changes fall within the scope of the appended claims.

Having thus described my invention, what I claim as new is:—

1. A device of the class described comprising a blower, a cylinder connected with the inlet of the blower, means for heating the air passing to the cylinder, means for controlling the amount of air passing into the cylinder, an upwardly extending discharge pipe on the blower, an extension for the pipe having a laterally extending discharge portion, and means for rotating the extension, step by step.

2. A device of the class described comprising a frame, a blower supported on the frame, a cylinder having one end connected to the inlet of the blower, damper controlled means for admitting air into the outer end of the cylinder, a tubular member connected with the cylinder, damper controlled means for admitting air into said tubular member, said tubular member being in communication with the cylinder, a burner in said tubular member, an upwardly extending spout connected with the discharge of the blower, an extension on the spout having a curved upper end and means for rotating the extension.

In testimony whereof I affix my signature.

JOHN H. ELLINGHAUSEN.